United States Patent
White et al.

(10) Patent No.: US 8,037,037 B2
(45) Date of Patent: Oct. 11, 2011

(54) SYSTEM FOR TRACKING MEDIA CONTENT TRANSACTIONS

(75) Inventors: Scott White, Austin, TX (US); Ian C. Schmehl, San Antonio, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 808 days.

(21) Appl. No.: 11/848,071

(22) Filed: Aug. 30, 2007

(65) Prior Publication Data

US 2009/0063581 A1    Mar. 5, 2009

(51) Int. Cl.
*G06F 17/00* (2006.01)
*G06F 7/00* (2006.01)
(52) U.S. Cl. .................................. 707/694; 707/677

(58) Field of Classification Search .................. 707/694, 707/677
See application file for complete search history.

(56) References Cited

U.S. PATENT DOCUMENTS

| | | | |
|---|---|---|---|
| 6,195,541 B1 * | 2/2001 | Griffith | 455/406 |
| 6,405,318 B1 * | 6/2002 | Rowland | 726/22 |
| 7,426,750 B2 * | 9/2008 | Cooper et al. | 726/26 |
| 7,512,964 B2 * | 3/2009 | Rodriguez et al. | 725/142 |
| 2008/0163307 A1 * | 7/2008 | Coburn et al. | 725/61 |

* cited by examiner

*Primary Examiner* — Sathyanarayan Pannala
(74) *Attorney, Agent, or Firm* — Guntin Meles & Gust, PLC; Douglas Schnabel

(57) ABSTRACT

A web server for tracking media content transaction includes a controller adapted to manage an archive of media content for a subscriber and to record a transaction description and a corresponding tracking identifier for a transaction that manipulates the archive.

20 Claims, 4 Drawing Sheets

300

SYSTEM FOR TRACKING MEDIA CONTENT TRANSACTIONS

FIELD OF THE DISCLOSURE

The present disclosure relates generally to media content management and more specifically to a system for tracking media content transactions.

BACKGROUND

Online storage solutions for managing digital media content such as personal videos, pictures, podcasts, etc. provide users nearly no discernible trace of a trail the media has followed in getting to and leaving the storage site. Typically when uploading media files to a storage site, the user is apprised that the upload operation is complete with no other notification generally provided. There is also minimal oversight with other transactional activities such as deletions, modifications, or additions of media content managed by the storage site. Consequently, when someone enters a subscriber's media storage account without authorization and misappropriates content or maliciously destroys files, the subscriber is often unaware.

DETAILED DESCRIPTION

In one embodiment of the present disclosure, a computer-readable storage medium can have computer instructions for creating an archive of one or more media content files, receiving a request to carry out a transaction associated with the archive, generating a tracking number for the transaction, carrying out the transaction, generating a description of the transaction, recording the description with the tracking number, and transmitting a notice to a communication device of a subscriber of the archive comprising a portion of the description and associated tracking number.

In one embodiment of the present disclosure, a web server can have a controller adapted to manage an archive of media content for a subscriber, and record a transaction description and a corresponding tracking identifier for a transaction that manipulates the archive.

In one embodiment of the present disclosure, a media content processor can have a controller adapted to manage a plurality of transactions applied to an archive of media content by recording a transaction description and a corresponding identifier for each of the plurality of transactions.

Figure 1:
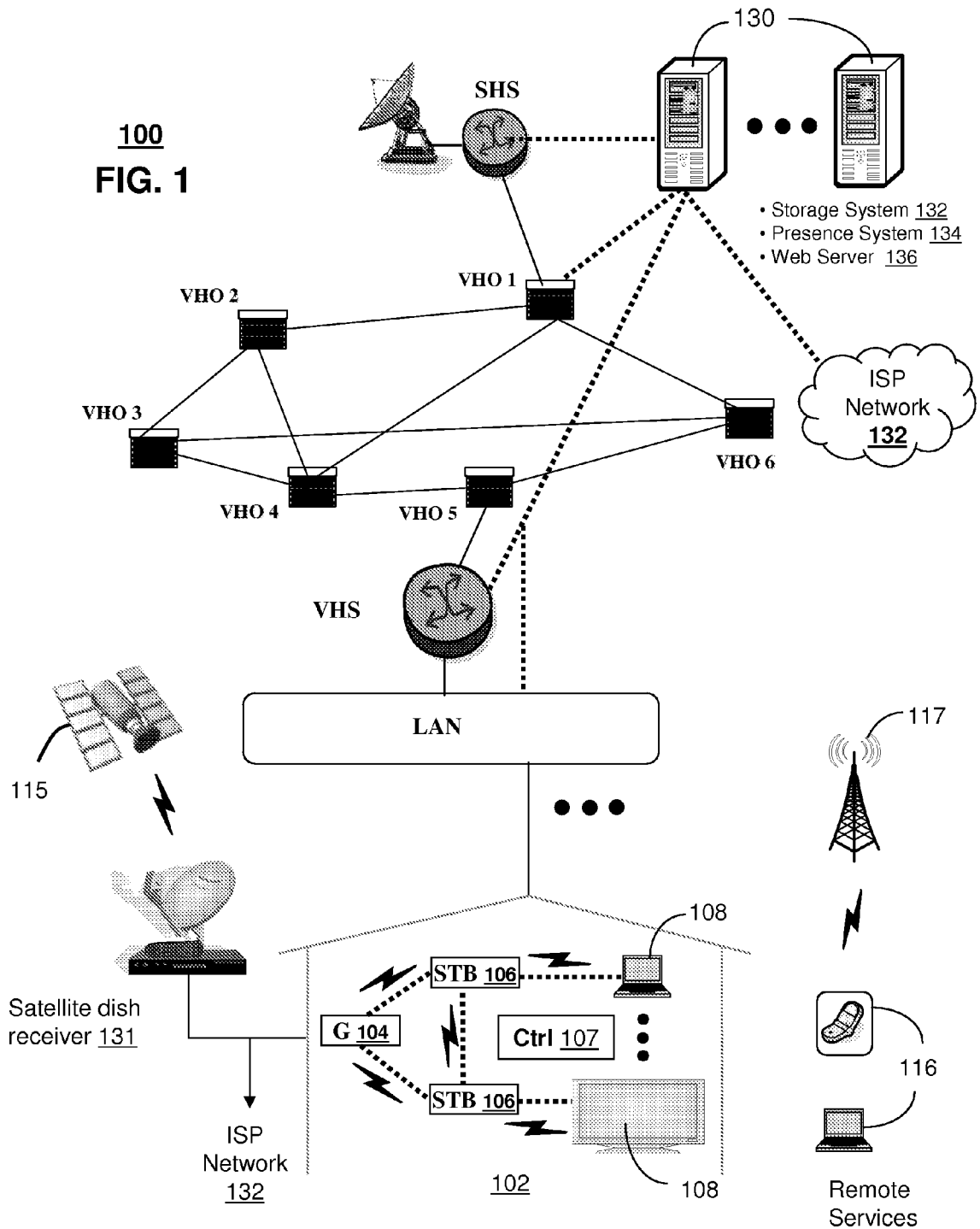
FIG. 1 depicts an exemplary embodiment of a communication system.

FIG. 1 depicts an exemplary embodiment of a communication system 100. The communication system 100 can represent an IPTV broadcast media system. In a typical IPTV infrastructure, there is at least one super head office server (SHS) which receives national media programs from satellite and/or media servers from service providers of multimedia broadcast channels. In the present context, media programs can represent audio only content, video only content, and combinations thereof. The SHS server forwards IP packets associated with the media content to video head servers (VHS) via a network of video head offices (VHO) according to a common multicast communication method.

The VHS then distributes multimedia broadcast programs to commercial and/or residential buildings 102 housing a gateway 104 (e.g., a residential gateway or RG). The gateway 104 distributes broadcast signals to media content processors 106 such as Set-Top Boxes (STBs) which in turn present broadcast selections to media devices 108 such as computers or television units managed in some instances by a media controller 107 (e.g., an infrared or RF remote control). Unicast traffic can also be exchanged between the media content processors 106 and subsystems of the IPTV media system for services such as video-on-demand (VoD).

The IPTV media system can be coupled to one or more computing devices 130 coupled to an Internet Service Provider (ISP) network 132 serving a number of functions. In one embodiment for instance, the computing devices 130 operate as a web or Internet server 132 for providing portal services over the ISP network 132 to fixed media devices 108 or portable communication devices 116 by way of a wireless base station 117 such as in a cellular communication network operating with common protocols (GSM, CDMA, etc.). In another embodiment, the computing devices 130 can operate as an on-line storage system 134 for managing media content of a plurality of subscribers of the communication system 100.

In yet another embodiment, the computing devices 130 can operate as a presence system 136 for monitoring activities and whereabouts of subscribers of the communication system 100. The presence system 136 can for example detect that the subscriber is in transit with a portable communication device 116 by detecting a handover transition between base stations 117 and/or by receiving location coordinates from the portable communication device using a Global Positioning System (GPS) receiver incorporated therein. The presence system can also detect that the subscriber is utilizing a communication device 108 in building 102 based on network activity emanating from said communication device or consumed thereby.

A satellite broadcast system can be used in place of the IPTV media system. In this embodiment, signals transmitted by a satellite 115 can be intercepted by a satellite dish receiver 131 coupled to building 102 which conveys satellite media signals to the media content processors 106 by way of gateway 104. Alternatively, the satellite signals can be received and processed by the media content processor 106 over a satellite port of the media content processor coupled to the satellite dish receiver 131. The media content processors 106 can also be equipped with a broadband port that couples to the ISP network 132 for general broadband access.

Although not shown, the communication system 100 can also be combined or replaced with analog or digital broadcast distributions systems such as cable TV systems. It would be apparent therefore to one of ordinary skill in the art that the present disclosure can be applied to any media content system.

Figure 2:
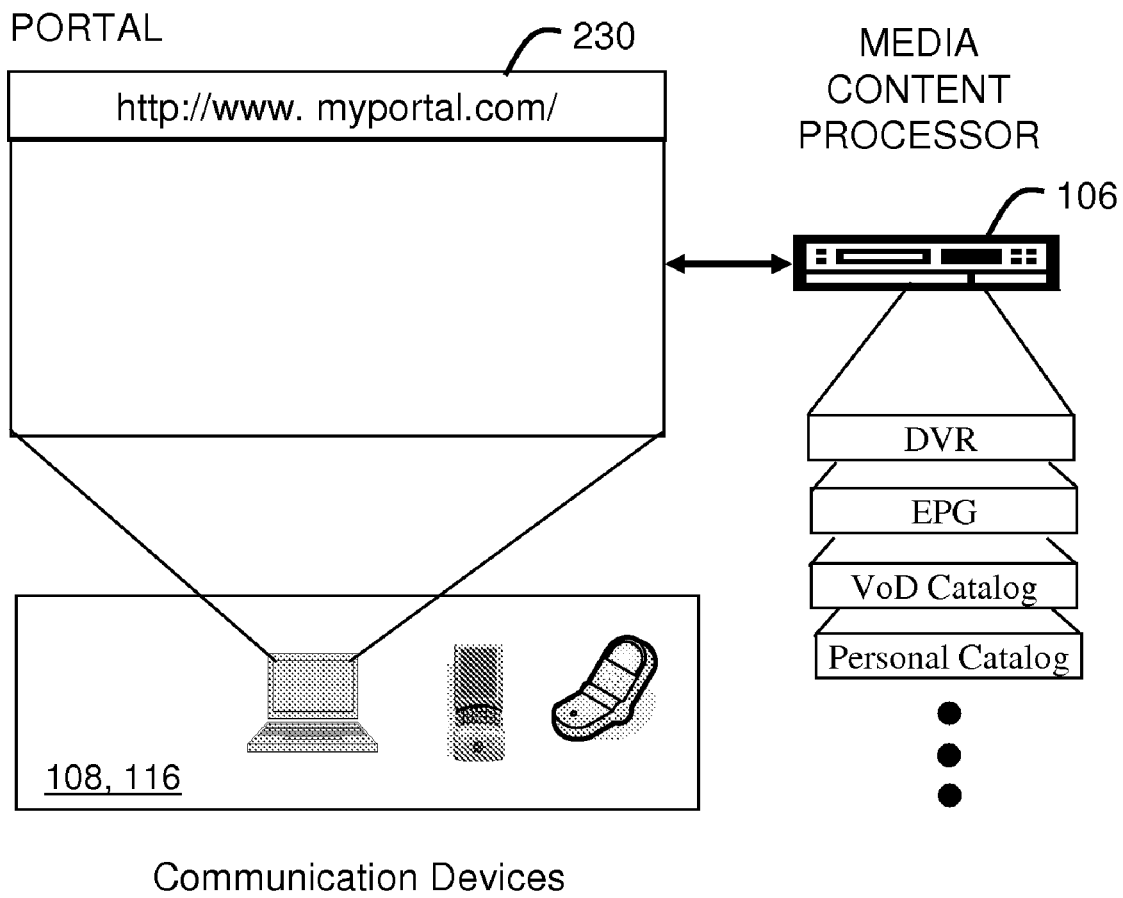
FIG. 2 depicts an exemplary embodiment of a portal of the communication system.

FIG. 2 depicts an exemplary embodiment of a portal 230 of the communication system 100. In FIG. 2, the portal 230 can be accessed by a URL with a common browser such as Microsoft's Internet Explorer using an Internet-capable fixed or portable communication device 108, 116. The portal 230 can be configured to access a media content processor 106 such as the STB of FIG. 1 and services managed thereby such as a Digital Video Recorder (DVR), an Electronic Programming Guide (EPG), Video on Demand (VoD) catalog, a personal catalog stored in the STB (e.g., personal videos, pictures, audio recordings, etc.), and so on by way of the gateway 104.

Figure 3:
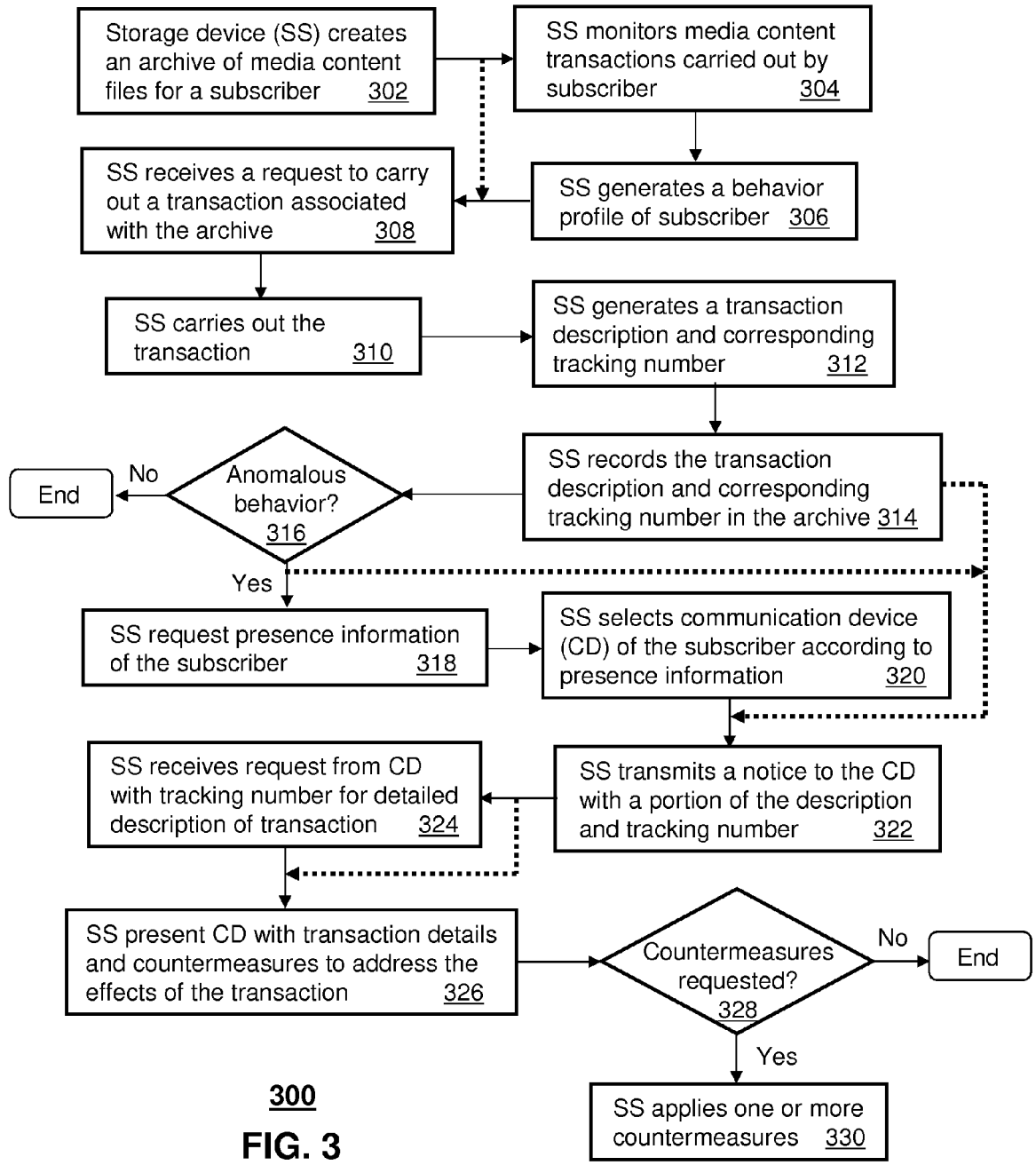
FIG. 3 depicts an exemplary method operating in portions of the communication system.

FIG. 3 depicts an exemplary method 300 operating in portions of the communication system 100. Method 300 begins with step 302 in which a storage system 134 (referred to herein as SS 132) creates an archive of media content files for a subscriber. The media content can represent audio content (e.g., personal recording, podcasts, MP3 content downloaded from iTunes™, ringtones for cell phones, etc.), video content (e.g., downloaded from a VoD catalog, family album video recordings, etc.), and/or still images (e.g., wall paper, personal picture album, etc.).

In step 304 the SS 132 can monitor media content transactions carried out by the subscriber. A transaction can represent for example any activity which the subscriber can undertake while accessing the archive. Such activities can include without limitation modifying a structure of the archive (e.g., changing directory or folder structure), reviewing or reading at least one media file in the archive (e.g., visual and/or audible presentation of a file), retrieving or removing at least one media file from the archive (e.g., removing a file from the archive), editing at least one media file in the archive (e.g., changing file name, cropping a picture, deleting portions of the content, etc.), deleting at least one media file in the archive, or recording an additional media file in the archive. Other transactions that can have an affect on the archive and its content are contemplated by the present disclosure.

Step 304 can be used by the SS 132 to detect usage patterns and thereby generate in step 306 a behavior profile of the subscriber. Common pattern detection and predictive techniques (e.g., linear regression) can be used in step 306 to predict the behavior of the subscriber. In step 308, the SS 132 can receive a request to carry out a transaction associated with the archive from any source that identifies itself as the subscriber. The request can include common validation information such as a login and password which enables access to the archived media content. The source from which the request was received can be a fixed or portable communication device 108, 116 able to access the ISP network 132 and thereby the SS 132. Responsive to the request, the SS 132 carries out one or more transactions applied to the archive as directed by the requesting party in step 310.

For each transaction the SS 132 carries out, it generates in step 312 a transaction description and a corresponding tracking number which is recorded in the archive of the subscriber in step 314. The transaction description can describe the time when the transaction was requested and/or carried out, the type of transaction (e.g., editing, deletion, retrieval, etc.), which media content files were affected, the IP address of the computer making the request, and so on. Accordingly, the SS 132 can be programmed to be as probative as necessary to collect as much transaction data as may be useful to the subscriber. The tracking number can be a string of characters, numbers or combinations thereof. Each tracking number is unique, so that the subscriber can single out each transaction recorded by the SS 132.

In situations where the subscriber's identity has been misappropriated, it is not always possible to know that the subscriber is not the individual making the request in step 308. To mitigate circumstances such as this, the SS 132 can be programmed in step 316 to look for anomalous behavior with the transaction. The anomalous behavior can be detected from a deviation between the transaction and the behavior profile of the subscriber. For example, the SS 132 could detect an excessive number of deletions, modifications, or an excessive duration of browsing through media files that have not been viewed by the subscriber quite some time. As noted earlier, statistical and/or predictive techniques can be used to detect such deviations.

If no anomalous behavior is detected, method 300 ceases and is repeated for subsequent transactions. If an anomalous behavior is detected, the SS 132 can proceed to step 318 where it requests from the presence system 136 presence information of the subscriber. The presence information can be used by the SS 132 to select in step 320 a communication device 108 or 116 of the subscriber that is likely to receive a notice transmitted in step 322 and alert the subscriber promptly. The notice can include a portion of the description generated in step 312 and its corresponding tracking number. The notice can be transmitted at a time during which the archive is being acted on in step 310 or after the transaction(s) requested in steps 308-310 are completed.

The partial description can include highlights of the transaction (e.g., time it took place, type of activity—deletion, modification, removal, etc., and affected files). The compact information can be used to reduce latency in transmission and to avoid overwhelming the subscriber with details. The notice can be transmitted by any wired or wireless common means of communication. For example, the notice can be transmitted as an email, a Rich Site Summary (RSS) message feed, a Short Message Service (SMS) message, a Multimedia Message Service (MMS) message, or a phone call conveying a synthesized speech message that describes the notice—among other possible methods.

Upon the communication device 108, 116 presenting the subscriber the notice by way of its user interface or UI (e.g., display and/or audio system), the subscriber can respond with a request for more detailed information about the transaction. The request can be submitted by the communication device 108, 116 to the SS 134 in step 324 accompanied with the tracking number to assist the SS in located the transaction details. Such a request can be generated by for example the subscriber replying to the email notice, or by responding to audio options presented by an interactive voice response system managed by the SS 132.

The SS 132 can present in step 326 the transaction details at the communication device 108, 118 along with optional countermeasures to address the effects of said transaction. Countermeasures can include for example a process for undoing at least a portion of the effects of the transaction. If for example the SS 132 performs daily or weekly incremental storage backups of its archives, then the SS can offer the subscriber a means to recover files that were deleted or modified. In addition to providing a restoration means, the SS 132 can provide the subscriber a means to increase security. For example, the SS 132 can provide a countermeasure to add or change an authorization process to access the archive (e.g., change an existing login and password or create a new one). The SS 132 can also provide the subscriber a means to discontinue access for all users if the subscriber determines the threat is significant. If the SS 132 detects that the subscriber has selected a countermeasure in step 328, the SS proceeds to step 330 where it applies it to the affected archive; otherwise, method 300 ends and is repeated for subsequent transactions.

Upon reviewing the aforementioned embodiments, it would be evident to an artisan with ordinary skill in the art that said embodiments can be modified, reduced, or enhanced without departing from the scope and spirit of the claims described below. For example, method 300 can be adapted so that notices are transmitted to a subscriber for all transactions without monitoring the usage patterns of the subscriber to detect anomalous transactions. Additionally, method 300 can be adapted so that notices are always transmitted to the same communication device without a reliance on presence information for the subscriber.

Method 300 can also be adapted in step 324 to establish communications between a service agent and the subscriber by way of the communication device 108, 116. The service agent can represent a person employed by a service provider of the communication system 100 to assist the subscriber in tracing and assessing suspect transactions with one or more tracking numbers supplied by the subscriber in notices received thereby. Alternatively, the service agent can represent an interactive voice response system managed by the SS 132 that interacts with the subscriber using synthesized speech, and recognizes subscriber responses in the form of voice and/or dial-tone keypad entries.

In yet another embodiment, method 300 can be adapted so that it operates in the media content processor (MCP) 106 rather than a centralized system such as the SS 132. In this embodiment, the MCP 106 creates archives of media content for a select subscriber. In a multi-user setting, the MCP 106 can create archived accounts. In either case, the MCP 106 can perform in whole or in part the functions of the SS 132 as described above to provide the subscriber traceability of the transactions applied to media content archived by the MCP.

These are but a few examples of modifications that can be applied to the present disclosure without departing from the scope of the claims. Accordingly, the reader is directed to the claims section for a fuller understanding of the breadth and scope of the present disclosure.

Figure 4:
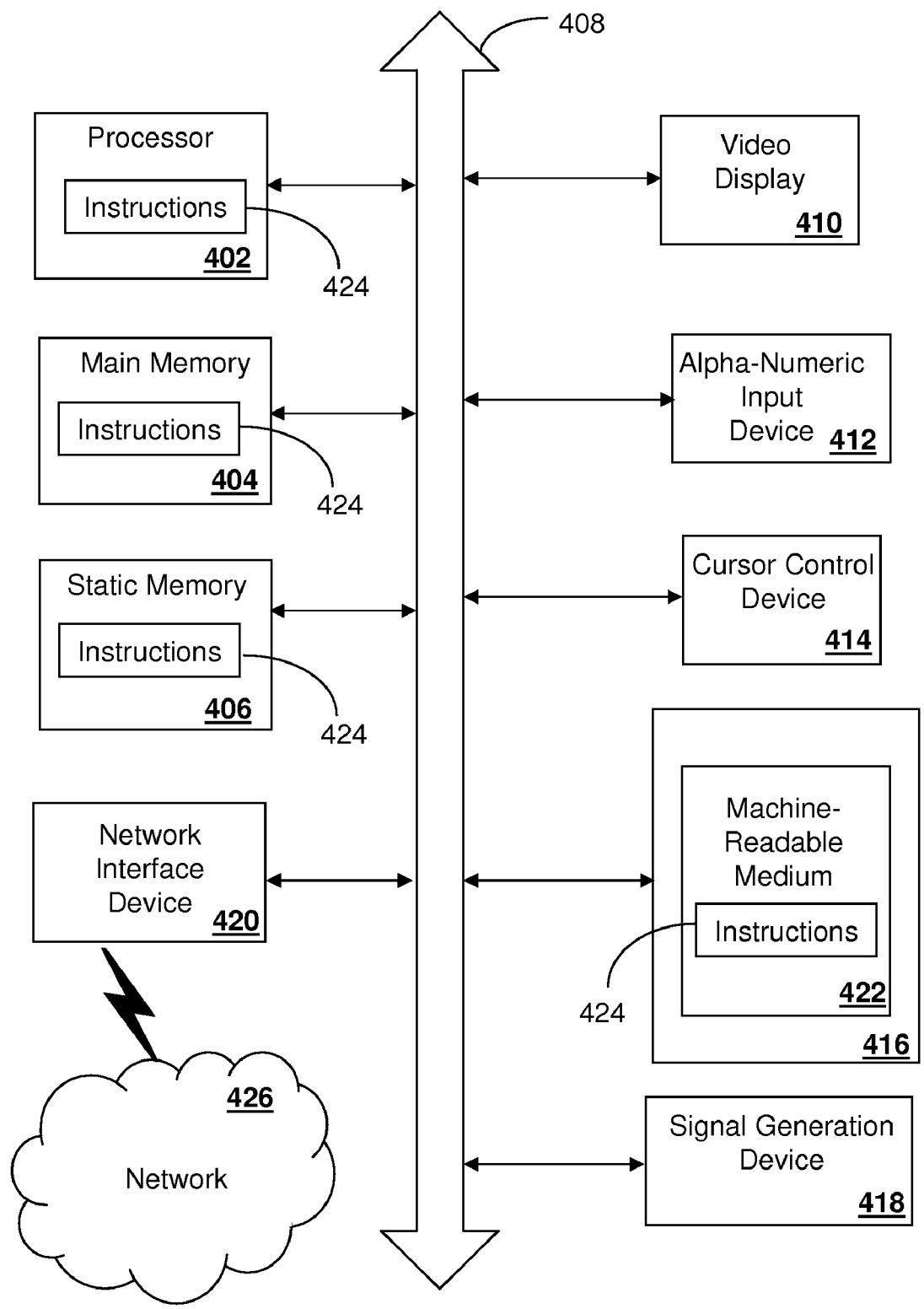
FIG. 4 is a diagrammatic representation of a machine in the form of a computer system within which a set of instructions, when executed, may cause the machine to perform any one or more of the methodologies discussed herein.

FIG. 4 depicts an exemplary diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a machine-readable medium 422 on which is stored one or more sets of instructions (e.g., software 424) embodying any one or more of the methodologies or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-readable non-transitory storage medium, comprising computer instructions to:
   store in an archive a plurality of media content files of a subscriber to the archive;
   receive a request to perform a transaction corresponding to at least one among reviewing, retrieving, editing and deleting at least one of the plurality of media content files of the subscriber;
   generate a tracking number of the transaction and a description for the transaction;
   perform the transaction;
   determine an anomalous access to the plurality of media content files of the subscriber responsive one or more detected differences between the performed transaction and a behavior profile of the subscriber comprising past transactions by the subscriber; and
   transmit a notice to a communication device of the subscriber responsive to the determined anomalous access, wherein the notice comprises the tracking number and at least a portion of the description of the transaction.

2. The non-transitory storage medium of claim 1, wherein the plurality of media content files corresponds to at least one among an audio content file, a video content file, and a still image file.

3. The non-transitory storage medium of claim 1, wherein the transaction corresponds to modifying a structure of the archive.

4. The non-transitory storage medium of claim 1, further comprising computer instructions to transmit the notice responsive to the determined anomalous access.

5. The non-transitory storage medium of claim 1, wherein the notice is transmitted to the communication device of the subscriber as one among an email message, a Rich Site Summary message feed, a Short Message Service message, a Multimedia Message Service message, and a phone call conveying a synthesized speech message that describes the notice.

6. The non-transitory storage medium of claim 1, comprising computer instructions to:
   receive from the communication device of the subscriber the tracking number with a request for a detailed description of the transaction; and
   perform at least one among presenting the communication device the detailed description of the transaction and establishing communications between a service agent and the subscriber by way of the communication device.

7. The non-transitory storage medium of claim 6, comprising computer instructions to:
   present to the communication device one or more countermeasures to address effects of the performed transaction;
   receive from the communication device a selection from the one or more countermeasures; and
   apply the selected counter-measure to the archive.

8. The non-transitory storage medium of claim 7, wherein the one or more countermeasures correspond to at least one among undoing at least a portion of the effects of the performed transaction, applying a user authorization process to access the archive, and preventing access to the archive.

9. The non-transitory storage medium of claim 1, wherein the storage medium operates in a network element of a communication system supplying media services to the subscriber, wherein the network element corresponds to one among a web server managing media content of a plurality of subscribers, and a media content processor of the subscriber, wherein the communication system corresponds to one among an internet protocol television communication system, a satellite television communication system, and a cable television communication system, and wherein the tracking number comprises at least one among a string of characters, a string of numbers, and a string of alphanumeric characters.

10. The non-transitory storage medium of claim 1, comprising computer instructions to:
   retrieve presence information associated with the subscriber; and
   select the communication device according to the presence information.

11. A web server, comprising a computer system comprising a computer memory coupled to a processor, wherein the processor is adapted to:

store a plurality of media content files of a subscriber in an archive;

record a transaction description and a corresponding tracking identifier for a transaction associated with the plurality of media content files of the subscriber;

perform the transaction corresponding to at least one among reviewing, retrieving, editing and deleting, at least one of the plurality of media contentment files of the subscriber;

determine an anomalous access in the archive to the plurality of media content files of the subscriber responsive to one or more detected differences between the performed transaction and a behavior profile of the subscriber comprising past transactions by the subscriber;

transmit to a communication device of the subscriber a notice responsive to the determined anomalous access, wherein the notice comprises a portion of the transaction description and the corresponding tracking identifier;

retrieve presence information associated with the subscriber; and select the communication device according to the presence information.

12. The web server of claim 11, wherein the plurality of media content files corresponds to one or more among audio content, video content, and still image content.

13. The web server of claim 11, wherein the processor is adapted to:

present the communication device with one or more countermeasures to address the transaction;

receive a selection associated with the one or more countermeasures; and apply the selected countermeasure to the archive.

14. The web server of claim 13, wherein the one or more countermeasures correspond to at least one among undoing at least a portion of the effects of the transaction, applying a user authorization process to access the archive, and preventing access to archive.

15. The web server of claim 11, wherein the tracking identifier comprises at least one among a string of characters, a string of numbers, and string of alphanumeric characters.

16. A media content processor, comprising a computer system comprising a computer memory coupled to a processor, wherein the processor is adapted to:

perform transactions corresponding to at least one among reviewing, retrieving, editing and deleting at least one of a plurality of media contentment files of a subscriber that are stored in an archive:

determine an anomalous access to the plurality of media content files of the subscriber by way of detecting differences between the performed transactions and a behavior profile of the subscriber comprising past transactions in the archive by the subscriber;

transmit to a communication device of the subscriber a notice of the determined anomalous access, wherein the notice comprises one or more countermeasures;

receive from the communication device a selection from the one or more countermeasures; and apply the selected countermeasure to the archive.

17. The media content processor of claim 16, wherein the plurality of media content files corresponds to one or more among audio content, video content, and still image content.

18. The media content processor of claim 16, wherein the notice further comprises a transaction identifier and a portion of a transaction description corresponding to the determined anomalous access.

19. The media content processor of claim 16, wherein the media content processor corresponds to one among an Internet Protocol Television Set-Top Box (IPTV STB) receiver, a satellite TV STB receiver, and a cable TV STB receiver.

20. The media content processor of claim 16, wherein the one or more countermeasures correspond to at least one among undoing at least a portion of the effects of the performed transaction, applying a user authorization process to access the archive, and preventing access to the archive.

* * * * *